US012489788B1

(12) United States Patent
Waters

(10) Patent No.: US 12,489,788 B1
(45) Date of Patent: Dec. 2, 2025

(54) PROGRAMMABLE NETWORKING DEVICE FOR USER PLANE FUNCTION WITH INTERNET PROTOCOL SECURITY (IPsec)

(71) Applicant: T-Mobile Innovations LLC, Overland Park, KS (US)

(72) Inventor: Brian Waters, Angel Fire, NM (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1186 days.

(21) Appl. No.: 17/328,252

(22) Filed: May 24, 2021

(51) Int. Cl.
H04L 9/40 (2022.01)
H04L 12/46 (2006.01)
H04L 67/14 (2022.01)
H04W 12/033 (2021.01)

(52) U.S. Cl.
CPC ........ *H04L 63/164* (2013.01); *H04L 12/4641* (2013.01); *H04L 63/0272* (2013.01); *H04L 63/029* (2013.01); *H04L 67/14* (2013.01); *H04W 12/033* (2021.01)

(58) Field of Classification Search
CPC ............... H04L 63/164; H04L 29/0272; H04L 12/4641; H04L 67/14; H04W 12/033
USPC .......................................................... 726/15
See application file for complete search history.

(56) References Cited

U.S. PATENT DOCUMENTS

| | | | |
|---|---|---|---|
| 7,698,455 B2 * | 4/2010 | Jalan .................... | H04L 49/354 709/236 |
| 8,165,152 B2 | 4/2012 | Sammour et al. | |
| 8,223,758 B2 | 7/2012 | Eriksson | |
| 8,243,732 B2 * | 8/2012 | Chen ...................... | H04L 45/74 370/352 |
| 8,259,571 B1 * | 9/2012 | Raphel ................. | H04L 61/2535 370/252 |
| 8,837,285 B2 | 9/2014 | Sammour et al. | |
| 10,958,620 B1 * | 3/2021 | Wei ...................... | H04L 45/7453 |
| 11,240,206 B2 * | 2/2022 | Chen ................... | H04L 12/4641 |
| 2006/0236388 A1 * | 10/2006 | Ying .................... | H04L 12/4641 726/15 |
| 2007/0195794 A1 * | 8/2007 | Fujita .................. | H04L 12/4641 370/395.53 |
| 2007/0271606 A1 * | 11/2007 | Amann ................. | H04W 12/02 726/15 |
| 2008/0186965 A1 * | 8/2008 | Zheng .................. | H04L 45/74 370/389 |

(Continued)

FOREIGN PATENT DOCUMENTS

EP 3442167 A1 * 2/2019 ......... H04L 12/2863
WO 2019/238252 A1 12/2019

OTHER PUBLICATIONS

Jesus Sanchez-Gomez, Integrating LPWAN Technologies in the 5G Ecosystem: A Survey on Security Challenges and Solutions, IEEE 2020.*

Primary Examiner — Samson B Lemma
(74) Attorney, Agent, or Firm — Jones Robb, PLLC

(57) ABSTRACT

Programmable network devices configured to perform various packet processing functions are further configured to use IPsec to secure control and data packets associated with data sessions traversing the UPF. Field-programmable gate arrays (FPGAs) and/or graphics processing units (GPUs) coupled with network interfaces are configured to perform user plane functions and secure data packet within a compact and modular hardware unit to minimize excessive communication while maintaining control and user plane separation (CUPS).

20 Claims, 7 Drawing Sheets

(56) References Cited

U.S. PATENT DOCUMENTS

| | | | |
|---|---|---|---|
| 2015/0365790 A1* | 12/2015 | Edge | H04W 76/50 |
| | | | 455/456.1 |
| 2016/0135096 A1* | 5/2016 | Poruri | H04W 36/0061 |
| | | | 370/331 |
| 2017/0223523 A1* | 8/2017 | Keller | H04W 8/082 |
| 2018/0048622 A1* | 2/2018 | Gaitatzis | H04L 63/0209 |
| 2019/0068520 A1* | 2/2019 | Kim | H04L 67/10 |
| 2019/0069182 A1* | 2/2019 | John | H04W 12/08 |
| 2019/0173841 A1* | 6/2019 | Wang | G06F 9/5083 |
| 2019/0182875 A1* | 6/2019 | Talebi Fard | H04W 76/11 |
| 2019/0335002 A1* | 10/2019 | Bogineni | H04W 8/22 |
| 2020/0245381 A1* | 7/2020 | Talebi Fard | H04W 24/02 |
| 2020/0259807 A1* | 8/2020 | Rastogi | H04L 63/164 |
| 2020/0280511 A1* | 9/2020 | Gapin | H04L 67/141 |
| 2020/0404069 A1* | 12/2020 | Li | H04L 67/59 |
| 2021/0136633 A1* | 5/2021 | Zetterlund | H04W 48/18 |
| 2022/0045989 A1* | 2/2022 | Chen | H04L 63/08 |
| 2022/0053401 A1* | 2/2022 | Foti | H04W 8/12 |
| 2022/0183088 A1* | 6/2022 | Huang | H04W 76/32 |
| 2024/0155452 A1* | 5/2024 | Salmela | H04W 36/13 |

* cited by examiner

PROGRAMMABLE NETWORKING DEVICE FOR USER PLANE FUNCTION WITH INTERNET PROTOCOL SECURITY (IPsec)

TECHNICAL BACKGROUND

As communication networks evolve and grow, there are ongoing challenges in communicating data across different types of networks. A communication network can include, for example, a combination of a wireless network and a packet data network such as the internet. Other types of communication networks in various combinations may be envisioned by those having ordinary skill in the art, such as wireline networks, local area networks (LANs), wide area networks (WANs), telephone networks, cellular networks, satellite networks, packet switched networks, and so on. Communicating data between these different types of networks requires specialized components, such as gateways, routers, switches, etc. For example, 4G networks utilize serving gateways (S-GW) and packet gateways (P-GW) located in the core network, and 5G networks utilize various servers collectively referred to as the session management function (SMF) and user plane function (UPF) to perform similar functions. Gateways and switches are useful for routing data packets from a source node to a destination node and traversing different networks, e.g. from an end-user wireless device attached to an access node, to a server on the internet, etc.

Further, there have been efforts to decouple session management from packet processing, such efforts being generally described as control and user plane separation (CUPS). While these CUPS efforts are useful, there still remain inefficiencies with transmitting data through existing gateways. For example, with increasing numbers of wireless devices and complexity of radio-access networks (RANs), there is more data being routed through core gateways or other servers prior to being routed. Thus, large amounts of data still have to traverse different network nodes in order to be properly routed to their destinations. Data in the order of billions of packets per second traverses modern networks, thus requiring robust packet processing mechanisms that cause excessive signaling between the control and user planes. For example, existing user plane functions (UPF in 5G, and user gateways in 4G) combine hardware components programmed strictly for packet processing (such as programmable network switches and devices) having very little processing dedicated towards "management" functions, and external servers or hosts for instructing the network switches how to process the data.

There are limitations with these implementations, specifically with regards to throughput limitations as to the amount of data that can be processed. This is partly due to the extra communication that is required between the switching hardware components and the external hosts/servers. For example, billions of packets per second involve many more quality of service (QoS) rules, forwarding rules, as well as generating reports and instructions for smooth pipeline processing. The capacity limitations of existing user plane functions results in lower-than-optimal throughput, which is undesirable for operators of modern communication networks. Further the security requirements of increased numbers of packets can result in excessive communications overhead in existing user plane functions (UPF). For example, implementing internet protocol security (IPsec) in host servers and gateways requires setting up of extra tunnels between network components, which can be impossible given the increasing volumes of data being transmitted.

OVERVIEW

Exemplary embodiments described herein include programmable network devices that are configured to perform various functions including applying quality of service (QoS) to data packets and data sessions, session management, data processing, pre-processing, post-processing, pipeline processing, and data transport and switching functions. Further described herein are systems including such programmable network devices, and methods executed by various components in such systems. Such programmable network devices can be configured to secure data packets and data sessions using Internet protocol security (IPsec), with multiple instances of host servers (each having its own IP address) being incorporated with a field-programmable gate array (FPGA) into a single programmable network device.

An exemplary method described herein includes configuring an embedded hardware device to perform a plurality of user plane functions on data packets routed through the embedded hardware device, and securing the data packets using internet protocol security (IPsec). The embedded hardware device comprises at least one of a field-programmable gate array (FPGA) or a graphics processing unit (GPU).

An exemplary programmable networking device described herein includes a processor, a memory coupled to the processor, the memory being configured to store a host module, and an embedded hardware device coupled to the memory, the embedded hardware device configured to perform operations comprising performing a plurality of user plane functions on data packets routed through the embedded hardware device, securing the data packets using internet protocol security (IPsec), and transmitting the data packets to the host module.

DETAILED DESCRIPTION

Figure 1:
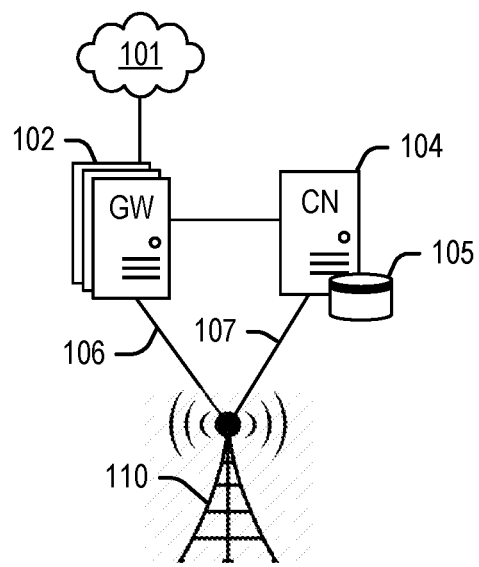
FIG. 1 depicts an exemplary system.
Figure 1:
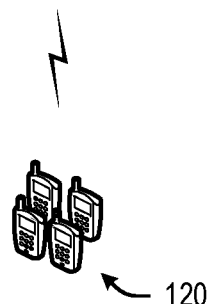

Embodiments disclosed herein provide programmable network devices that are configured to secure data packets and data sessions with IPsec (or any equivalent secure VPN protocol) while performing pipeline processing on a compact and modular hardware unit to minimize excessive communication while maintaining control and user plane separation (CUPS). The programmable network device can include one or more processors, memories, and one or more embedded hardware chips, such as a field programmable gate array (FPGA), an application-specific integrated circuit (ASIC), a graphics processing unit (GPU) with an integrated network interface, or similar. In exemplary embodiments described herein, one or more host modules on a memory coupled to a processor are configured to enable communication between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational levels, and so on. Further, a plurality of host instances can be deployed on the memory, each of which is assigned a unique IP address, and IPsec security can be used to secure the data packets and data sessions transmitted between each host instance and a respective network node.

Such programmable network devices can enhance or replace the myriad existing packet gateways, such as a CUPS based user plane S-GW, P-GW, or SAE-GW in 4G networks, and user plane functions (UPF) in 5G networks. This eliminates the need for an external host server, as well minimizing excessive communication and signaling that is required to communicate between the separate prior-art switches and external host servers. Whereas in the prior art, an external host server communicates with a dedicated networking device (such as a switch) and instructs the device with regards to QoS, session management, etc., providing a programmable network device with host, session management, and pipeline processing functions that interface with each other and perform data processing within a single unit preserves network resources such as power, bandwidth, etc. Further, prior art host servers must be configured with soft IPsec modules, which are woefully inadequate for securely processing volumes of data packets typical to modern telecommunications networks. In contrast, the disclosed programmable network switches including embedded hardware devices (e.g. FPGAs or GPUs) with IPsec functionality enables packet processing at line rate, while ensuring security. Hereinafter for the purposes of this disclosure, the terms "host", "host server", and "server" are considered as interchangeable.

Exemplary programmable network devices described herein may be positioned or located at various points within a network topology depending on a network operator's requirement. In an exemplary embodiment, a programmable network device as described herein can be co-located with an access node, such as a gNodeB or eNodeB, such that data flows may directly egress from the user plane at the radio access network (RAN) to the destination network. For example, the programmable network device can replace a user plane or data plane elements of a system architecture evolution (SAE) gateway in 4G networks, or can replace an intermediate UPF (iUPF) in 5G networks. This eliminates having to transport the data packets to central sites or networks. In further embodiments described herein, several programmable network devices can be arranged such that data packets originating from various RANs can traverse minimal other networks or nodes to reach their destination. Incorporating data management functions into these programmable network devices also minimizes the need for extra control plane elements and communication therebetween.

FIG. 1 depicts an exemplary system 100, including a communication network 101, gateway node(s) 102, controller node 104, access node 110, and wireless devices 120. Access node 110, along with other components (not illustrated herein), can be part of a radio access network (RAN) of a wireless network, and controller node 104 can be part of a core network of the wireless network. The one or more gateway node(s) 102 can include a 4G CUPS gateway, 5G UPF, or any other type of gateway. Further, the one or more gateway node(s) 102 can be distributed in various portions of the wireless network, such as coupled to access node 110 in the RAN, located within the core network, etc. In an exemplary embodiment, the one or more gateway node(s) 102 include a programmable network device as further described herein. Further, it is noted that while access node 110, wireless devices 120, gateway node(s) 102, and controller node 104 are illustrated in FIG. 1, any number of identical or additional network nodes and devices can be implemented. For example, FIGS. 5-6 respectively illustrate components of exemplary 5G networks.

Further, and as described in detail herein, one or more programmable network devices may be incorporated within system 100. For example, the one or more programmable network devices may be included within one or more gateway node(s) 102, at any logical or physical location within system 100. In an exemplary embodiment, a programmable network device incorporates a host module configured to manage data sessions and life cycles associated with data packets transmitted between wireless devices 120 and communication network 101. The programmable network device can further include one or more programmable hardware devices, e.g. FPGAs or GPUs, that are configured to perform user plane functions, including but not limited to pipeline processing, applying QoS policies, associating source nodes, destination nodes, bearers, tunnels (and so on) with the data packets, modifying headers of the data packets, encapsulation, decapsulation, routing table lookups, clock functions, timer synchronization, transport data packets associated with the data sessions to different network nodes, and other management and transport functions. Additionally, the FPGA can include extra memory that can be used for buffering packets, e.g. for QoS traffic shaping purposes, versus dropping packets if the current traffic policy indicates that a packet cannot be forwarded at a given time due to policy limits being reached. Further, the QoS tokens for maximum bit rate (MBR) and guaranteed bit rate (GBR) rules can be stored on the FPGA, and replenished as and when needed. Thus, incorporating the user plane functions and session management functions on the FPGA can result in more effective bandwidth utilization with fewer dropped packets, faster packet processing, and a more flexible QoS implementation.

In an exemplary embodiment, the FPGA is further configured to secure the data packets using the internet protocol security (IPsec) protocol. The data packets may be associated with one or more specific interfaces as a condition to securing the data packets using the IPsec protocol. The one or more specific interfaces include one or more of an N3 interface, an N6 interface, or an N9 interface. For example, the data packets can be associated with data sessions transmitted to or from one or more of a radio access network (RAN), a packet data network (PDN), or a second FPGA, each of which communicates with the programmable network device via the N3, N6, or N9 interfaces respectively. In further embodiments described herein (e.g. with reference to FIG. 4), the FPGA is communicatively coupled to a plurality of access nodes using the N3 interface. Alternatively or on addition, the one or more specific interfaces include an N4 interface, and the data packets are associated with control data transmitted to or from a session management function (SMF). In the event that a plurality of host instances is deployed on the programmable network device, each host instance can be assigned a unique internet protocol (IP) address. Thus, each host instance communicates with one or more session management functions (SMFs) via an N4 interface to the unique IP address. For example, each host instance can be associated with a network slice. In these embodiments, securing the data packets comprises encapsulating the data packets in an IPsec tunnel associated with the unique IP address for each host.

In addition to the programmable network devices described herein, gateway node(s) 102 can include additional standalone computing device, computing systems, or network components, and can be accessible, for example, by a wired or wireless connection, or through an indirect connection such as through a computer network or communication network. For example, gateway node(s) 102 can additionally include a 4G CUPS gateway, such as any combination of a control-plane serving gateway (SGW-C), user-plane serving gateway (SGW-U), control-plane packet data network gateway (PGW-C), user-plane packet data network gateway (PGW-U), a 5G user plane function (UPF), etc. One of ordinary skill in the art would recognize that gateway node(s) 102 are not limited to any specific technology architecture, such as Long Term Evolution (LTE) or 5G NR, and can be used with any network architecture and/or protocol.

Gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface. Specific gateway node(s) 102 comprising processing nodes and programmable network devices are further described herein with reference to FIGS. 2-3.

Controller node 104 can be any network node configured to communicate information and/or control information over system 100. Controller node 104 can be a standalone computing device, computing system, or network component, and can be accessible, for example, by a wired or wireless connection, or through an indirect connection such as through a computer network or communication network. For example, controller node 104 can include a mobility management entity (EME), a session management function (SMF), an access and mobility function (AMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing control information related to data sessions and data packets that traverse one or more gateway(s) 102. This information may be requested by or shared with gateway(s) 102, access node 110, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof. In an exemplary embodiment, communication network 101 includes a packet data network (PDN), such as the internet.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include N1, N2, N3, N4, and N6 interfaces. Other protocols can also be used. Communication link 106 can be a direct link or might include various equipment, intermediate components, systems, and networks. Communication link 106 may comprise many different signals sharing the same link.

Access node 110 can be any network node configured to provide communication between wireless devices 120 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node(s) 102 via communication link 106 and with controller node 104 via communication link 107. Access node 110 may communicate with other access nodes (not shown) using a direct link such as an X2 link or similar.

Wireless devices 120 may be any device, system, combination of devices, or other such communication platform capable of communicating wirelessly with access node 110 using one or more frequency bands deployed therefrom. Each of wireless devices 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
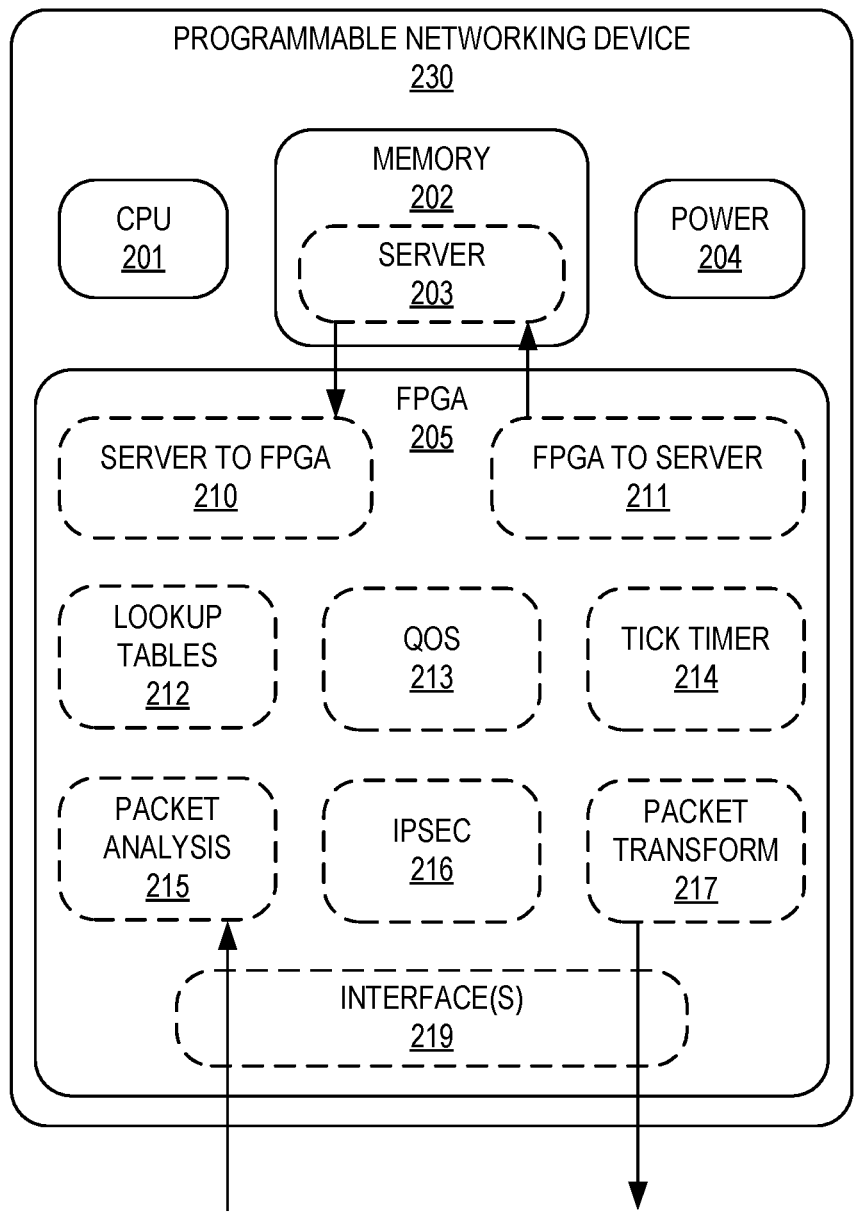
FIG. 2 depicts an exemplary programmable networking device configured to perform user plane functions.

FIG. 2 depicts an exemplary programmable network device 230. Programmable network device 230 includes at least a host module or server 203 stored on a memory 202, a processor 201, a power supply 204, and a FPGA 205. Server 203 is configured to manage data sessions and life cycles associated with data packets that are processed by FPGA 205, and to interface with a control plane network node or gateway. For example, server 203 can receive control-plane instructions from a session management function (SMF), a gateway control plane (SGW-C, PGW-C, or SAEGW-C), or a controller node. Further, server 203 can initiate processes or kernels on the FPGA 205, or interface with persistent kernels, and communicate information about data packets and sessions between the kernels on FPGA 205 and other network elements, such as on the control plane as described above. FPGA 205 can include one or more programmable logic gates and a memory for storing instructions enabling the use of single AND/OR functions to more complex functions that enable use of the FPGA as a comprehensive multi-core processor, such as kernels 210-217. Generally, FPGAs can be optimized for particular workloads, e.g. video and imaging, to circuitry for computer, auto, aerospace, and military applications, in addition to electronics for specialized processing and more. FPGAs are particularly useful for prototyping ASICs or processors, and combined with other circuits and/or processing systems or nodes, such as pipeline processing components further described herein. It is to be understood that FPGA 205 can further include components that are not shown herein, but understood as being necessary to execute the functions described below, such as a memory and a processor. The kernels described herein may be programmed using a high-level programming language, such as C++ or equivalent. An abstraction layer similar to oneAPI may be used to build the kernels, enabling the kernels to operate persistently.

In this exemplary embodiment, FPGA 205 is programmed with functions in the form of kernels, including at least host to FPGA kernel 210, FPGA to host kernel 211, lookup tables 212, QoS kernel 213, tick timer kernel 214, packet analysis kernel 215, IPsec kernel 216, and packet transformation kernel 217. For the purposes of this disclosure, a kernel is equivalent to a piece of code that contains executable instructions for specific tasks, including user plane functions. Further, each kernel can communicate with other kernels, and transfer information to and from other kernels. For example, a packet analysis kernel 215 is configured to receive data packets within one or more data streams, and forward the data packets to other kernels, such as QoS kernel 213. Packet analysis kernel 215 may further refer to lookup tables 212 to determine how and where to forward the data packet. IPsec kernel 216 is configured to encapsulate and/or decapsulate data packets associated with data sessions in IPsec tunnels. Packet transformation kernel 217 may be configured to modify headers and forward data packets to other network nodes.

Further, programmable network device 230 can includes one or more ports (not shown herein) that are associated with different reference points, or configured to communicate with different network nodes such as access nodes or wireless devices (on the RAN), one or more gateways or functions on the core network, or any other network node on the PDN, including but not limited to application servers, session management, proxy, web server, media server, or end-user wireless devices coupled to another wireless network or RAN. For example, a programmable network device can include a first set of ports associated with reference points for data transmission between different network nodes, and a second set of ports associated with reference points for control signal transmission between different network nodes. In an exemplary embodiment, a programmable network device includes at least a port associated with the N3 reference point, which is used as a data input or output between the programmable network device and a radio access network or access node within the radio access network. In an exemplary embodiment, a programmable network device includes at least a port associated with the N6 reference point, which is used as a data input or output between the programmable network device and a packet data network (PDN). In an exemplary embodiment, a programmable network device includes at least a port associated with the N9 reference point, which is used as a data input or output between the programmable network device and another programmable network device, such as an intermediate UPF (iUPF) in 5G networks. Further, in an exemplary embodiment, a programmable network device 230 includes at least a port associated with a control signal reference point, such as the N4 reference point, which is used as an input for control signals. For example, as described herein, a management module in a programmable network device is configured to receive session information from a control gateway (SGW-C or PGW-C) or session management function (SMF), via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on. In an exemplary embodiment, information received via the N4 reference point enables the programmable network device to perform session life cycle management. In an exemplary embodiment, in 4G networks, the port is associated with a S1-U or S5/S8-U interface or reference point.

In an exemplary embodiment, the FPGA 205 and/or host server 203 are further configured to secure the data packets using the internet protocol security (IPsec) protocol. The data packets may be associated with one or more specific interfaces as a condition to securing the data packets using the IPsec protocol. The one or more specific interfaces include one or more of an N3 interface, an N6 interface, or an N9 interface. For example, the data packets can be associated with data sessions transmitted to or from one or more of a radio access network (RAN), a packet data network (PDN), or a second FPGA, each of which communicates with the programmable network device 230 via the N3, N6, or N9 interfaces respectively from among interfaces 219. In an exemplary embodiment, data may optionally flow through the IPSec kernel 216 in addition to interfaces 219, as illustrated herein.

For the purposes of this disclosure, a "kernel" is a piece of code that gets started at a clock cycle and runs to completion however many clock cycles that takes. There is the ability to quickly send messages from one kernel to another, and then establish (logically) a pipeline of steps that gets executed. Different packets at different stages going through the pipeline. This stands in contrast to prior art systems, where the limitation is in a number of threads and physical number of cores associated with a host. Whereas in the disclosed embodiment, as many kernels as needed can concurrently be executed on an FPGA. While the server 203 can initiate a kernel on FPGA 205, the kernels are persistent, and continue processing packets traversing the programmable network device 230. Thus, an entire pipeline process is performed by a single device, without extraneous network communication. This is enabled by large memory sizes of FPGA 205 (e.g. 8 GB or more).

Further in exemplary embodiments, a pipeline of a data packet (i.e. a single flow) can be broken down into several steps, with different packets in different steps of that pipeline processing. In other words, a pipeline process can be broken down and processed sequentially, with multiple sessions being performed in parallel. In one exemplary embodiment, a FPGA 205 comprises 4×100 gb ports, and 4 FPGAs can be provided within a single rack unit. This can provide a theoretical data throughput of 1.6 TB, enabling these programmable network devices to process data equivalent to today's major urban areas. In an exemplary embodiment, multiple instances of a host program may be executed on a single programmable network device, enabling multiple instances that provide parallel processing functions between different network ports. Further, the one or more specific interfaces include an N4 interface, and the data packets are associated with control data transmitted in between each host instance and one or more SMFs. Thus, control data packets (that are separate from data packets associated with a data session, i.e. on the user plane) are also secured with IPsec. Each host instance deployed on memory 202 can be configured with IPsec, and is assigned a unique internet protocol (IP) address, as further described with respect to FIGS. 3 and 4. Securing the data packets comprises encapsulating the data packets in an IPsec tunnel associated with the unique IP address for each host.

Figure 3:
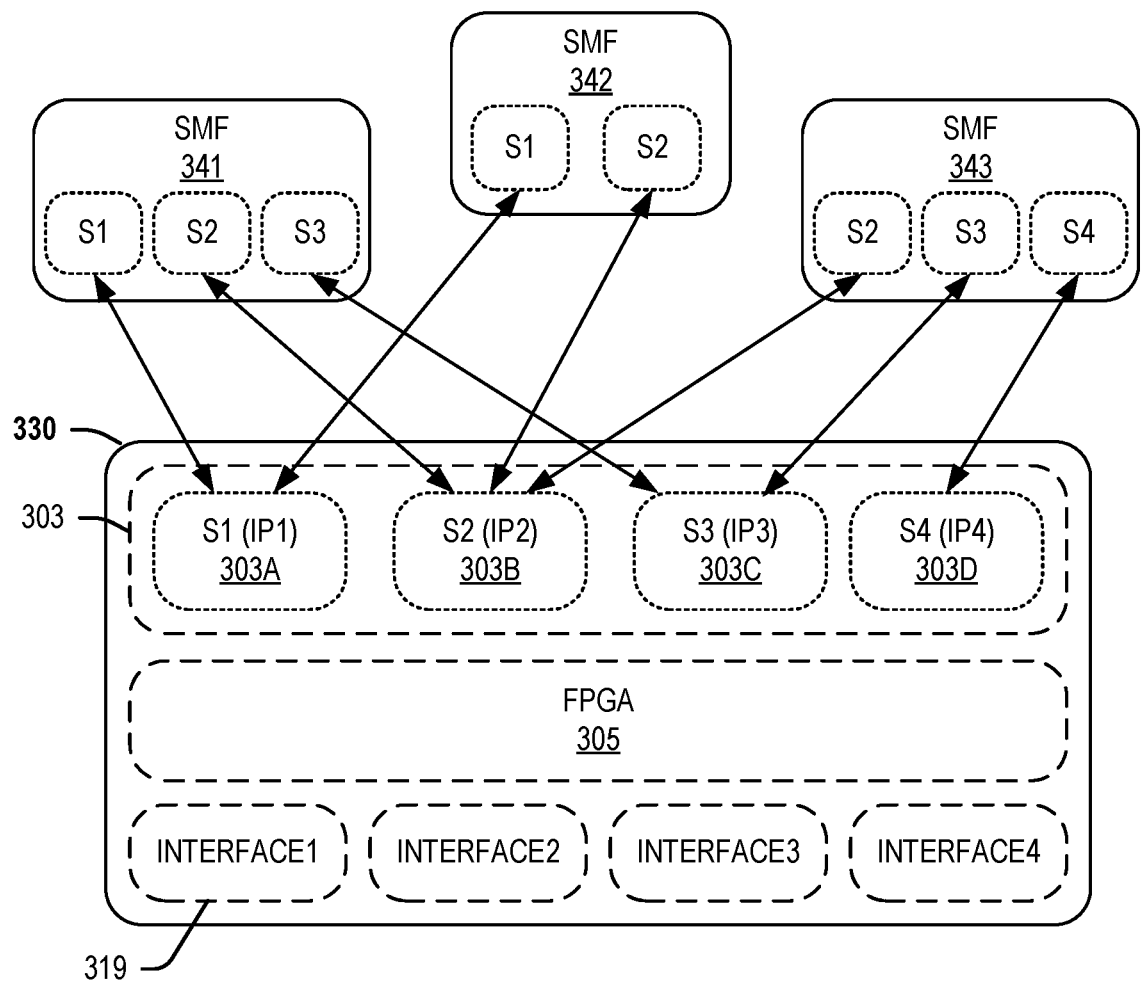
FIG. 3 depicts another exemplary programmable networking device configured to perform user plane functions.

FIG. 3 illustrates an exemplary programmable network device 330 that is configured with a plurality of virtual hosts (or host instances) 303A-303D communicatively coupled to a single FPGA 305. Plurality of host instances 303A-303D are configured on a single host server 303, similar to server 203 in FIG. 2. Not illustrated herein (for simplicity's sake) are additional components that will be understood as being included in host server 303 by those having ordinary skill in the art, such as a processor, memory, etc.

The programmable network device 330 can be used to perform network slicing, especially in 5G networks. For example, each virtual host instance 303A-303D can be configured to communicate with one or more SMFs 341-343 and transmit data sessions associated with different network slices. To each SMF 341-343 (and to any other external network node), host instances 303A-303D each appears to be a different or separate UPF node. This is enabled by configuring each host instance 303A-303D with a different network address, such as an IP address. Slice information is generally transmitted throughout a 5G radio access network and core, but typically not transmitted to UPF nodes. This is because, generally in the signaling to UPF (via N4) there is nothing related to network slicing. Thus, each UPF slice (S1, S2, S3, etc.) appears to be a separate UPF. Whereas, each different SMF maintains slice information related to sessions associated with each slice S1, S2, S3, etc.

This configuration is particularly effective for network slicing implementation purposes, especially with regards to rule enforcement. For example, a policy and charging (PCF) is used to establish predefined rules for a network slice. Meanwhile, FPGA 305 stores a configuration for each slice, including predefined rules associated therewith. When the PCF sends rule activation information to one or more SMFs 341-343, which then gets forwarded to programmable network device 330, a rule name is activated, rather than having to process all the details of the predefined rule dynamically. In other words, the dynamic association with slices is performed at the control plane (at SMFs 341-343, PCFs, etc.), while at the user plane (at programmable network device 330 and specifically at FPGA 305), only rules are activated without needing to be associated with slices. Thus, a single FPGA (e.g. FPGA 305) becomes a common resource for multiple network slices, which reduces the need for multiple interfaces 319 per slice, reducing waste and extra overhead. Further, security of control and user data packets is enhanced by incorporating IPsec into programmable network device 330, either at one or both of FPGA 305 and host sessions 303A-303D.

Figure 4:
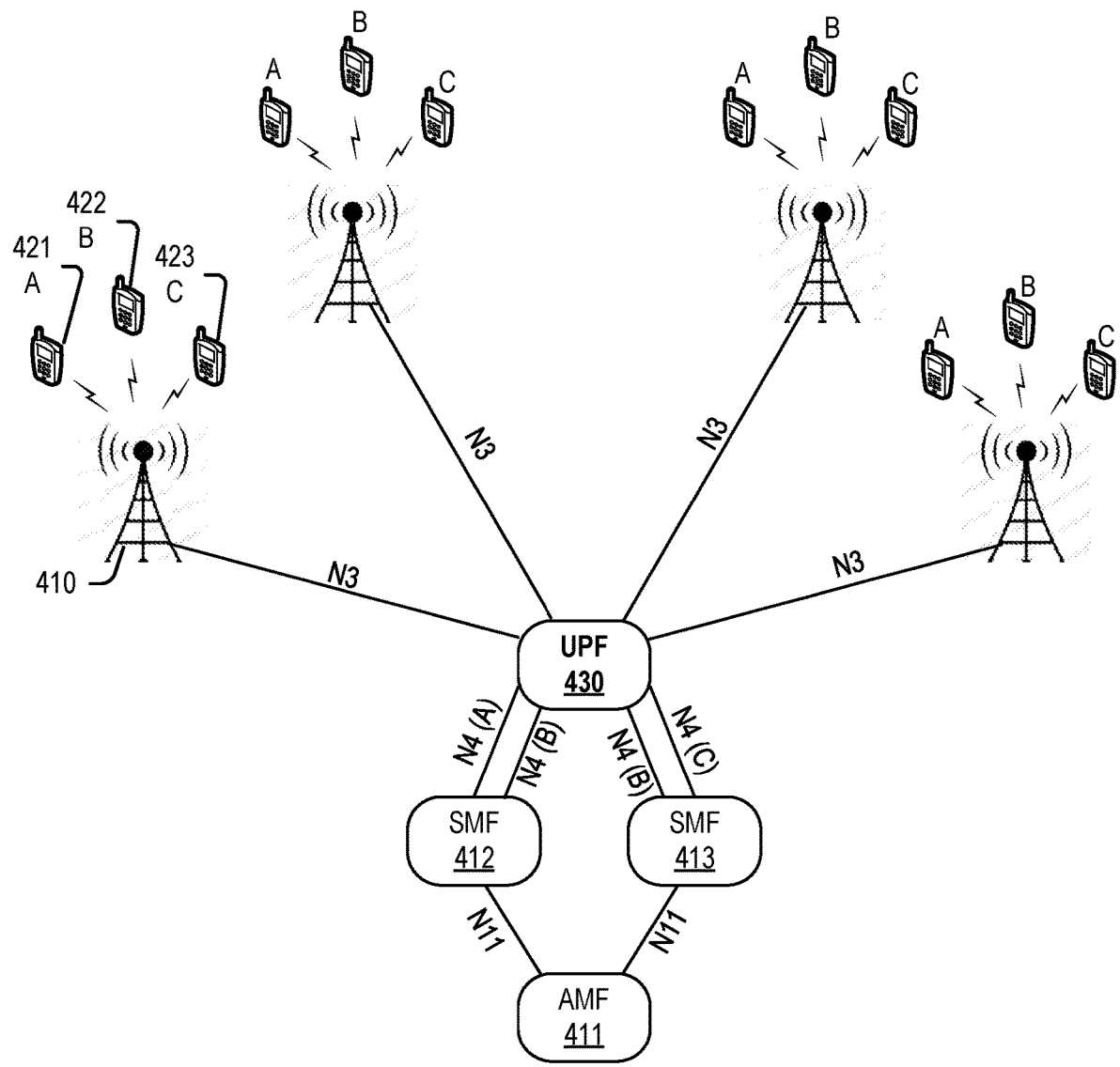
FIG. 4 depicts an exemplary programmable network device used for network slicing.

FIG. 4 illustrates a programmable network switch 430 that is similar to programmable network switch 330. For example, programmable network switch 430 includes a plurality of host instances configured to communicate with one or more SMFs (e.g. SMFs 412, 413), 341-343 and transmit data sessions associated with different network slices, and configured with a different network address, such as an IP address. Further illustrated are a plurality of access nodes, e.g. access node 410, each coupled to a plurality of wireless devices, e.g. wireless devices 421, 422, 423. Further, at least three network slices are illustrated as being depicted by the letters A, B, and C. For example, a first network slice is provided between wireless device 421 and SMF 412, a second network slice is provided between wireless device 422 and one (or both) of SMF 412, 413, and a third network slice is provided between wireless device 423 and SMF 413. Data sessions within each network slice are secured using IPsec. The data packets may be associated with one or more specific interfaces as a condition to securing the data packets using IPsec. The one or more specific interfaces include one or more of an N3 interface (e.g. between access node 410 and programmable network device 430), an N6 interface, or an N9 interface. Further, control data associated with each network slice and transmitted between programmable network device 430 and one or both of SMFs 412, 413 is also secured with IPsec. For example, each host instance with a unique internet protocol (IP) address communicates with SMFs 412, 413 via an N4 interface, and securing the data packets comprises encapsulating the data packets in an IPsec tunnel associated with the unique IP address for each host.

As further described below with references to FIGS. 5-6, programmable network devices (such as programmable network device 230) can replace the myriad components of existing 5G UPFs, and may similarly be positioned or located at various points within a network topology depending on a network operator's requirement. In an exemplary embodiment, a programmable network device as described herein can be co-located with an access node, such as a gNodeB or eNodeB, such that data flows may directly egress from the user plane at the radio access network (RAN) to the destination network. This eliminates having to transport the data packets to central sites or networks.

Figure 5:
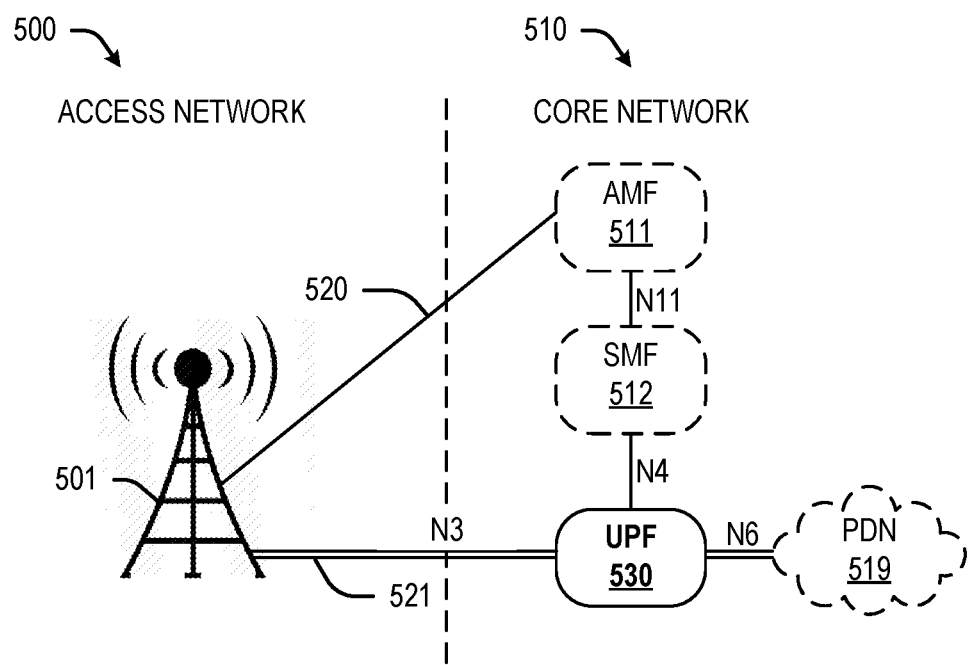
FIG. 5 depicts an exemplary programmable network device implemented in a 5G system.

FIG. 5 depicts exemplary programmable network device 530 implemented in a 5G system. The components of exemplary 5G access network 500 include at least an access node 501, which can include a gNodeB, and may function similarly to access node 110 described in FIG. 1. Further, the programmable network devices 530 and 515 can be similar to the programmable network device 230. For example, programmable network devices 530, 515 can include a processor, a memory, and a FPGA or equivalent device that is configured to perform the various user plane and pipeline processing functions described herein (i.e. UPF). Such a programmable network device may comprise multiple hardware circuits and software modules associated with the different types of functions, all of which are incorporated into a single hardware unit, such as a rack-mountable unit. Data packets associated with data sessions are routed through a "pipeline" comprising these circuits and modules, such that the different types of functions are configured to perform "pipeline processing" of the data packets in real time, and without the excessive signaling and transmission required by prior-art configurations of control and data gateways.

Specifically, data packets traverse access network 500 and core network 510 via the user plane 521, while control signals are transmitted across access network 500 and core network 510 via the control plane 520. The AMF 511 can receive connection requests from one or more wireless devices via access node 501, and manages tasks associated with connection or mobility management, while forwarding session management requirements over an N11 interface to the SMF 512. Meanwhile, the SMF 512 is primarily responsible for interacting with the decoupled data plane 521, creating updating and removing Protocol Data Unit (PDU) sessions and managing session context with a User Plane Function (UPF), which in this embodiment, is replaced with a programmable network device 530. Generally, the UPF represents the data plane evolution of a 4G CUPS system, which decouples PGW control and user plane functions, enabling the data forwarding component (PGW-U) to be decentralized. This allows packet processing and traffic aggregation to be performed closer to the network edge, increasing bandwidth efficiencies while reducing network. The PGW's handling signaling traffic (PGW-C) remain in the core, northbound of the Mobility Management Entity (MME). The UPF functions similarly, by providing an interconnect point between the mobile infrastructure and the packet data network (PDN) 519, encapsulation and decapsulation of GPRS Tunnelling Protocol for the user plane (GTP-U), acting as a PDU session anchor point for providing mobility within and between Radio Access Technologies (RATs), including sending one or more end marker packets to the gNodeB access node 501, and packet routing and forwarding functions.

Meanwhile, as described herein, traditional UPFs practically include a plurality of different servers and switches, thereby adding signaling complexity to existing networks. These various components also utilize excessive resources, since they usually comprise general purpose servers running a standard operating system that is configured to implement the interfaces between the control plane 520 and the UPF, and would need to provision the management functions of the data down to the hardware switches responsible for transporting data across the user plane 521, thereby creating a bottleneck in communication. Thus, incorporating the programmable network device 530, configured to perform the various data session management functions performed by prior-art UPFs, eliminates the need for an external host server, as well minimizing excessive communication and signaling that is required to communicate between the prior-art switches and other gateways and servers. Further, providing a programmable network device 530 with multiple different functions that interface with each other and perform pipeline processing within a single unit preserves network resources such as power, bandwidth, etc.

Further, the programmable network device 530 can include one or more ports that are associated with different reference points. For example, programmable network device 530 can include a first set of ports associated with reference points for data transmission between different network nodes, and a second set of ports associated with reference points for control signal transmission between different network nodes. This can include at least a port associated with the N3 reference point, which is used as a data input or output between the programmable network device 530 and access node 501. Further, programmable network switch 530 includes at least a port associated with the N6 reference point, which is used as a data input or output between the programmable network switch and PDN 519. Further, the programmable network switch 530 includes at least a port associated with the N9 reference point, which is used as a data input or output between other programmable network switches not shown herein. Further, the programmable network switch 530 includes at least a port associated with a control signal reference point, such as the N4 reference point, which is used as an input for control signals via control plane 520. For example, as described herein, a server or host module in programmable network switch 530 is configured to receive session information from SMF 512, via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on.

Further, several programmable network devices can be arranged such that data packets originating from various RANs can traverse minimal other networks or nodes to reach their destination. Incorporating data management functions into these programmable network devices also minimizes the need for extra control plane elements and communication therebetween. Since it is beneficial to have the user plane co-located (or as close as network architecture allows) to the access node, and then directly egress from that user plane to the destination network (e.g. PDN 519), this configuration reduces or eliminates extraneous transport of data through the core network. These benefits may be further enhanced by providing a plurality of programmable network devices deployed close to access nodes, and fewer control plane elements (e.g. AMF 511 and SMF 512).

Figure 6:
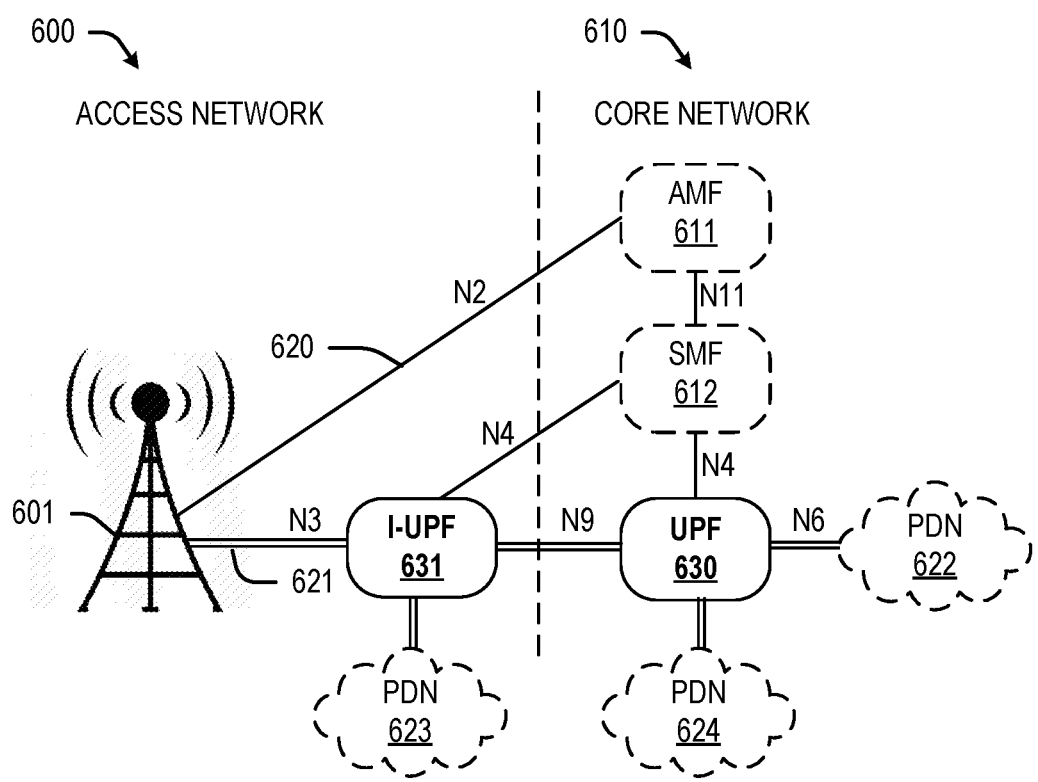
FIG. 6 depicts a plurality of exemplary programmable network devices implemented in another 5G system.

For example, FIG. 6 illustrates a plurality of exemplary programmable network devices provided in a 5G network. Similar to FIG. 5, the components of exemplary 5G access network 600 include at least an access node 601, which can include a gNodeB, and may function similarly to access node 110 described in FIG. 1. Further, access network 600 includes an additional programmable network device 631. Other components not shown herein, such as cell site routers, gateways, switches, controllers, etc. may be envisioned by those having ordinary skill in the art in light of this disclosure. In this embodiment, the programmable network devices 631, 630 can be similar to the programmable network device 230. Further, programmable network device 631 enables direct user-plane access to any other network node, PDN or SMF 612 directly from the access network 600, with the control signaling being provided by SMF 612. Certain specialized applications that need to have connectivity close to the access network 600 benefit from this implementation, since the user plane 621 need not be traversed all the way into the core network 610. Certain application servers may be accessible such that services corresponding to these application servers can be accessed directly, in contrast with other network nodes that may only be accessible via combination of PDN 623 and programmable network device 630. This is beneficial for edge-deployment of network services, versus other network nodes that are only accessible via PDN 623.

Further, the programmable network devices 631, 630 can include one or more ports that are associated with different reference points. For example, each programmable network device 631, 630 can include a first set of ports associated with reference points for data transmission between different network nodes, and a second set of ports associated with reference points for control signal transmission between different network nodes. This can include at least a port associated with the N3 reference point, which is used as a data input or output between the programmable network device and access node 601. Further, each programmable network device 631, 630 includes at least a port associated with the N6 reference point, which is used as a data input or output between the programmable network device and a PDN (e.g. PDN 622, 623, 624). Further, each programmable network device 631, 630 includes at least a port associated with the N9 reference point, which is used as a data input or output between other programmable network devices not shown herein. Further, each programmable network device 631, 630 includes at least a port associated with a control signal reference point, such as the N4 reference point, which is used as an input for control signals via control plane 620. For example, as described herein, a host module in each programmable network device 631, 630 is configured to receive session information from SMF 612, via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on. In this exemplary embodiment, packets associated with one or more of these reference points can be secured with IPsec at line rate, by virtue of incorporating IPsec in each programmable network device 630 and 631.

Figure 7:
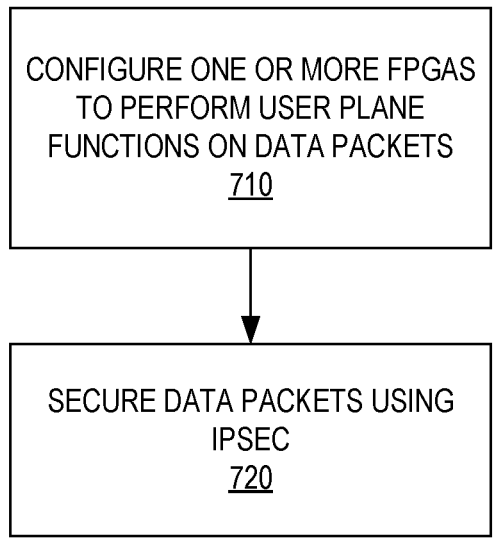
FIG. 7 depicts exemplary operations performed by a programmable network device.

FIG. 7 depicts exemplary operations performed by a programmable network device. For example, the operations of FIG. 7 may be performed by one or more FPGAs coupled to a networking device similar to device 230 or 300. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, the one or more FPGAs are configured to perform user plane functions. For example, a host module on a memory coupled to a processor can interface between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational layers, and so on. Further, at 720, data packets associated with data sessions are secured using IPsec.

Figure 8:
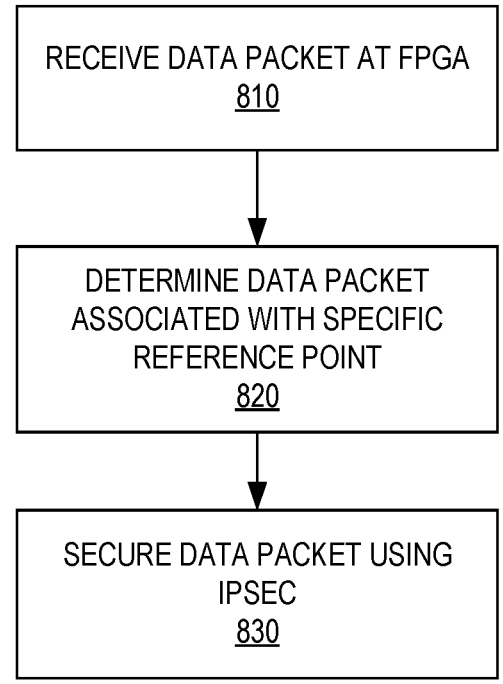
FIG. 8 depicts exemplary operations performed by a programmable network device.

FIG. 8 depicts exemplary operations performed by a programmable network device. For example, the operations of FIG. 8 may be performed by one or more FPGAs coupled to a networking device similar to device 230 or 300. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a data packet is received at an FPGA. The data packet can be associated with a user data session, e.g. between a wireless device and a packet data network (PDN). For example, the data packet can be a data packet within the user data session, such as a video stream, instant message, or the like. Alternatively, the data packet can be a control data packet containing control information associated with the data session. In either case, if the data packet is sent or received via a specific reference point, that is determined at 820, upon which the data packet is secured using IPsec. Further, the data packet may be associated with one or more specific interfaces as a condition to securing the data packets using the IPsec protocol. For example, the data packets can be associated with data sessions transmitted to or from one or more of a radio access network (RAN), a packet data network (PDN), or a second FPGA, each of which communicates with the programmable network device via the N3, N6, or N9 interfaces respectively. Alternatively or on addition, the one or more specific interfaces include an N4 interface, and the data packets are associated with control data transmitted to or from a session management function (SMF). In the event that a plurality of host instances is deployed on the programmable network device, each host instance can be assigned a unique internet protocol (IP) address. Thus, each host instance communicates with one or more session management functions (SMFs) via an N4 interface to the unique IP address. For example, each host instance can be associated with a network slice. Securing the data packets at 830 comprises encapsulating the data packets in an IPsec tunnel associated with the unique IP address for each host.

Additional functions performed by exemplary programmable network devices disclosed herein can include communicating with other network components, such as a controller node, managing health of different network nodes such as eNodeBs, gNodeBs, other components of a UPF, or any network node along the data path, as well as tunnel identification management, session identifier management, and so on. In exemplary embodiments, the programmable network device receives control-plane instructions from a session management function (SMF) in the case of 5G, and the SGW-C and PGW-C in the case of 4G. Based on the instructions from the controller node, a host module of the programmable network device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.

Various embodiments have been disclosed for utilizing a programmable network device, such as a FPGA or GPU with network interfaces, for user plane function, whereby user data packets are processed within a single device without having to be transmitted to and from other network nodes for processing. Exemplary programmable network devices are programmed using a high-level programming language, such as C++, and can utilize commercially available hardware in novel configurations as described herein, such as a small-footprint (1 rack unit) server with up to 1.6 Tb raw throughput. Thus, a single UPF device is interoperable with multiple SMFs provided by different network operators or vendors, via for example the N4 interface as needed. Such programmable network devices can deliver QoS support (e.g. MBR enforcement, GBR compliance, downlink DSCP marking, etc.), as well as UPF network slicing by configuring logically separate UPF's for the N4 interface on a single server, while utilizing an FPGA as a common resource across the slices. Each network slice can be configured to support predefined rules for quality of service enforcement (QER), forwarding action (FAR), usage reporting (URR), etc., and can further focus on separate processing of IP multimedia system (IMS) versus regular internet user traffic.

In light of this disclosure, it will be evident to those having ordinary skill in the art that any specialized circuits including FPGAs, GPUs, and other types of processors, can be configured to perform the pipeline processing, auxiliary processing (i.e. pre and post processing), and data management operations, so long as they are in direct communication with each other and incorporated within a small 1-2 unit network node, thereby mitigating the need for extraneous communication across different network nodes in different geographical regions. Further, the exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, comprising:
configuring an embedded hardware device to perform a plurality of user plane functions on data packets routed through the embedded hardware device, wherein configuring the embedded hardware device comprises:
communicatively coupling the embedded hardware device with a plurality of host instances, wherein each host instance is associated with a corresponding network slice; and
activating a predefined rule stored in the embedded hardware device for a network slice associated with a host instance and a data session that includes the data packets without associating the network slice with the embedded hardware device; and
securing the data packets that directly egress from a user plane of a radio access network (RAN) to a destination network using a secure virtual private networking (VPN) protocol.

2. The method of claim 1, further comprising determining that the data packets are associated with one or more specific interfaces as a condition to securing the data packets using IPsec.

3. The method of claim 2, wherein the one or more specific interfaces include one or more of an N3 interface, an N6 interface, or an N9 interface.

4. The method of claim 3, wherein the data packets are associated with data sessions transmitted to or from one or more of the RAN, a packet data network (PDN), or a second embedded hardware device.

5. The method of claim 4, wherein the embedded hardware device is communicatively coupled to a plurality of access nodes using the N3 interface.

6. The method of claim 2, wherein the one or more specific interfaces include an N4 interface, and the data packets are associated with control data transmitted to or from a session management function (SMF).

7. The method of claim 1, wherein each host instance is assigned a unique internet protocol (IP) address.

8. The method of claim 7, wherein securing the data packets comprises encapsulating the data packets in an IPsec tunnel associated with the unique IP address for each host.

9. The method of claim 1, wherein the embedded hardware device comprises at least one of a field-programmable gate array (FPGA) or a graphics processing unit (GPU).

10. The method of claim 1, wherein the secure VPN utilizes internet protocol security (IPsec).

11. The method of claim 1, further comprising storing predefined rules for each network slice associated with a corresponding host instance at the embedded hardware device.

12. A programmable networking device, comprising:
a processor;
a memory coupled to the processor, the memory being configured to store a host module; and
an embedded hardware device coupled to the memory, the embedded hardware device configured to perform operations comprising:
  performing a plurality of user plane functions on data packets routed through the embedded hardware device;
  communicatively coupling the embedded hardware device with a plurality of host instances, wherein each host instance is associated with a corresponding network slice;
  activating a predefined rule stored in the embedded hardware device for a network slice associated with a host instance and a data session that includes the data packets without associating the network slice with the embedded hardware device;
  securing the data packets that directly egress from a user plane of a radio access network (RAN) to a destination network using internet protocol security (IPsec); and
  transmitting the data packets to the host module.

13. The programmable networking device of claim 12, wherein the operations further comprise determining that the data packets are associated with one or more specific interfaces as a condition to securing the data packets using IPsec.

14. The programmable networking device of claim 13, wherein the one or more specific interfaces include one or more of an N3 interface, an N6 interface, or an N9 interface.

15. The programmable networking device of claim 14, wherein the data packets are associated with data sessions transmitted to or from one or more of the RAN, a packet data network (PDN), or a second FPGA.

16. The programmable networking device of claim 15, wherein the programmable networking device is communicatively coupled to a plurality of access nodes using the N3 interface.

17. The programmable networking device of claim 13, wherein the one or more specific interfaces include an N4 interface, and the data packets are associated with control data transmitted to or from a session management function (SMF).

18. The programmable networking device of claim 12, wherein each host instance being assigned a unique internet protocol (IP) address.

19. The programmable networking device of claim 12, wherein each host instance is coupled to one or more session management functions (SMFs) via an N4 interface.

20. The programmable networking device of claim 12, wherein the embedded hardware device comprises at least one of a field-programmable gate array (FPGA) or a graphics processing unit (GPU).

* * * * *